INVENTORS
SEYMOUR R. CRAY
JAMES E. THORNTON

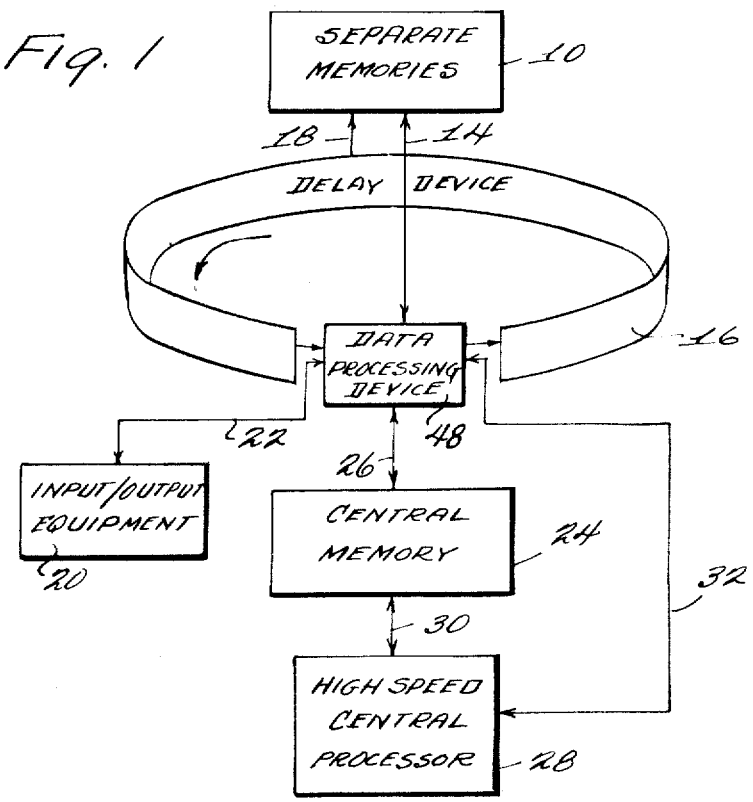
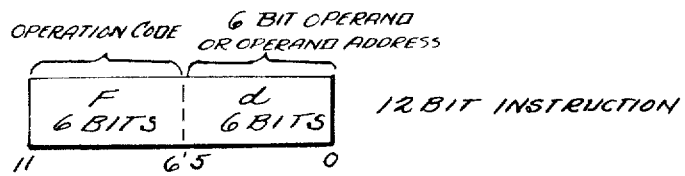
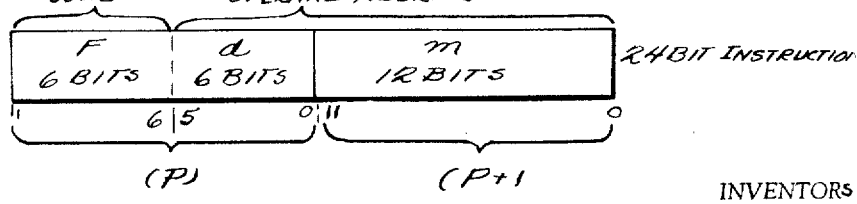
INVENTORS
SEYMOUR R. CRAY
JAMES E. THORNTON
BY
*Cushman, Darby & Cushman*
ATTORNEYS

| | 300 | 302 | 304 | 306 | 308 | 310 |
|---|---|---|---|---|---|---|
| | .2r | .2r | 1.2r | .2r | .2r | 1.2r |
| | .2 | 1.2 | .2 | 1.2 | 1.2 | .2 |
| | 1.2 | .2 | .2 | 1.2 | 1.2 | .2 |
| | 1.2 | 1.2 | .2 | 1.2 | 1.2 | .2 |

| Symbol | Logical Function | Significance |
|---|---|---|
| → | INVERSION | TRANSISTOR |
| □ | OR COMBINATION | COLLECTOR LOAD RESISTANCE |
| ○ | AND COMBINATION | COLLECTOR RESISTANCE |

INVENTORS
SEYMOUR R. CRAY
JAMES E. THORNTON

BY
Cushman, Darby & Cushman
ATTORNEYS

INVENTORS
SEYMOUR R. CRAY
JAMES E. THORNTON

BY Cushman, Darby & Cushman
ATTORNEYS

United States Patent Office 3,337,854
Patented Aug. 22, 1967

3,337,854
MULTI-PROCESSOR USING THE PRINCIPLE OF TIME-SHARING
Seymour R. Cray and James E. Thornton, Chippewa Falls, Wis., assignors to Control Data Corporation, Minneapolis, Minn., a corporation of Minnesota
Filed July 8, 1964, Ser. No. 381,072
7 Claims. (Cl. 340—172.5)

ABSTRACT OF THE DISCLOSURE

The present invention is concerned with a data processing apparatus which provides for the time sharing of a plurality of computer programs in a single data processing device. This is accomplished through the use of a plurality of memory storage sources for storing the individual programs and a corresponding number of delay registers for temporarily storing the program instruction and operand data upon which the data processing device can sequentially operate. A means is provided for allowing the data processing device to perform information transfers between any of the memory storage sources and a plurality of external input/output equipment.

---

This invention is directed towards a time sharing processor and more particularly toward an input/output system having a plurality of input/output processors which time share the use of common data processing units.

In modern high speed digital computers, a high speed central processor is able to compute at a much faster rate than its input/output section is able to communicate with generally slower input and output units. Thus if a central processor is required to communicate directly with input and output units via its input/output section, the central processor must wait between the receipt of each block of digital data. Several techniques have been developed wherein the high speed central processor is buffered from its input/output section permitting the central processor to perform calculations between receipt of each block of digital data. Using this technique, the central processor is interrupted and re-started for each block of digital data received.

Other improvements have been made which make the input and output section of a high speed digital computer completely autonomous from the central processor providing a common central memory or storage means for communication between the processor and its input/output section.

As the processing time, capacity and complexity of high speed central processors are improved, additional functions are imposed on the input/output section of the computer. These additional functions include: receiving of digital data in blocks from the input and output units and assembling the blocks into a format for use by the high speed central processor; communicating simultaneously with several input and output units, communicating directly with the high speed central processor when necessary, and performing calculations on digital data necessary for preparation of the data in a format for use by the central processor.

This invention discloses the use of a plurality of input/output sections, or time sharing processors, which are a plurality of separate storage means time sharing the use of common data processing units such as adders and necessary instruction control facilities. The result is a plurality of autonomous time sharing processors which cooperate with a high speed central processor through a common central memory.

An example of a typical high speed central processor with which the time sharing processors may be utilized is disclosed in a copending patent application entitled "Digital Computer Central Processor," Ser. No. 381,076, by James E. Thornton and Seymour R. Cray, filed July 8, 1964.

It is therefore the primary object of this invention to provide a fast, independent, multiple-service input and output facility for a central processor.

Another object of this invention is to provide a time sharing processor which will communicate with generally slower input and output equipment while permitting independent computation by a high speed central processor.

Yet another object of this invention is to provide a plurality of time sharing processors which can communicate with a plurality of input and output units concurrently.

A further object of this invention is to provide a plurality of time sharing processors which will maintain order on all input/output channels including the time when simultaneous input/output operations are performed.

Another object of this invention is to provide a time sharing processor in which programs are executed in a multiplexing arrangement which uses the principle of time-sharing.

Still another object of this invention is to provide a plurality of time sharing processors each having separate memory means for storing a program while time sharing a common data processing device, which device in turn shares a common central memory with a high speed central processor.

These and other objects and the entire scope of the invention will become more fully apparent when considered in light of the following detailed description of an illustrative embodiment of this invention and from the appended claims.

FIGURE 1 is an overall diagram illustrating the general arrangements between time sharing processors, the input and output equipment and the central memory.

FIGURE 2 is an illustration of the format of a 12 bit instruction which is to be executed by a time sharing processor.

FIGURE 3 is an illustration of the format of a 24 bit instruction having the same function as the instruction of FIGURE 2.

Figure 4:
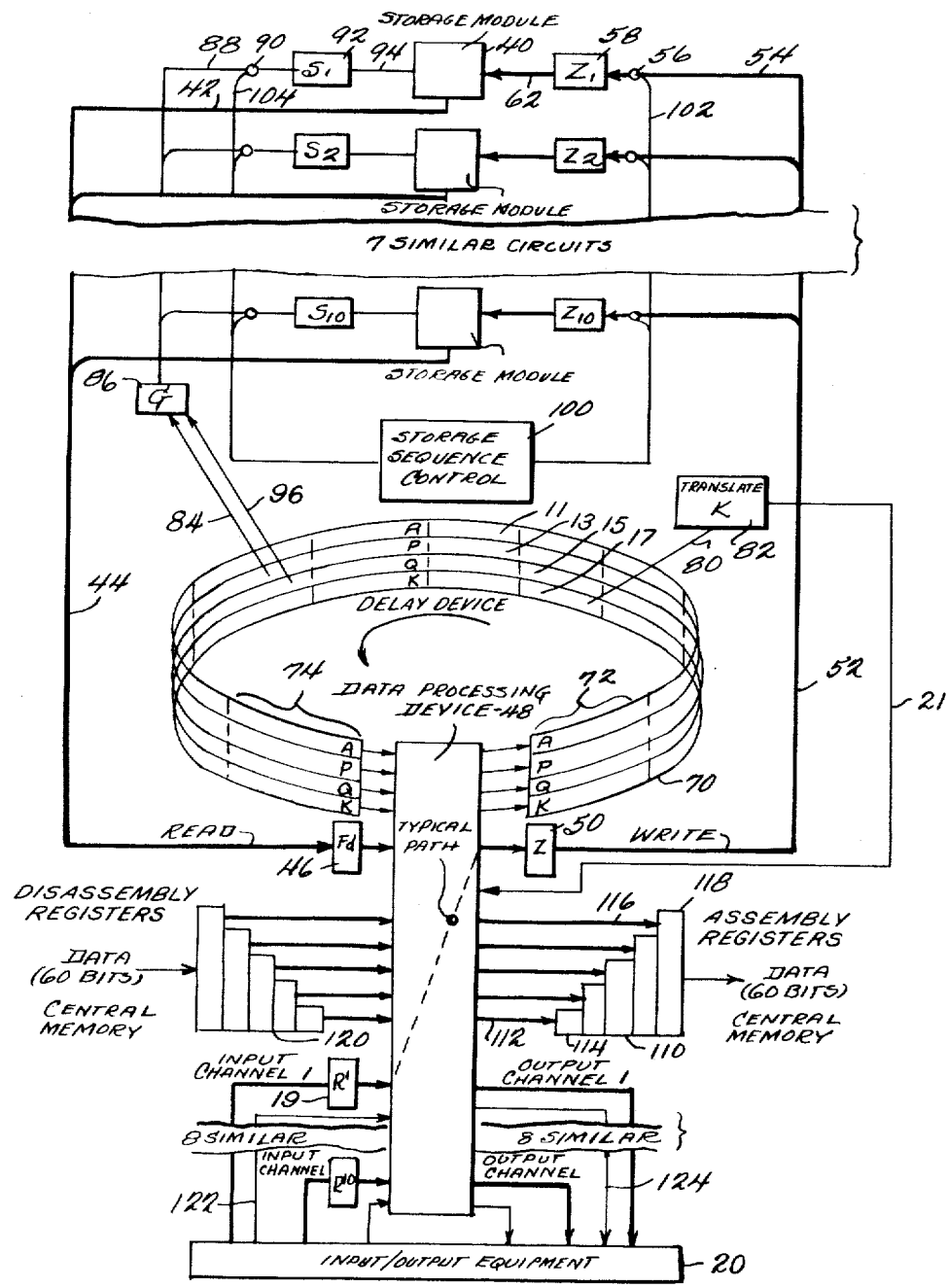
FIGURE 4 is a logical diagram illustrating the separate memories, the time shared data processing device, the input/output channels and their associated controls.

Briefly, this invention includes a system wherein a storage means for storing digital information and an external source of digital information are coupled to a data processing device. The data processing device is capable of performing data processing operations on digital information. The data processing device also includes a first means for transferring digital information between the storage means and the data processing device. The data processing device includes a second means for transferring digital information between the data processing device and the external source of digital information. A delay device is coupled to the data processing device. The delay device has a plurality of stage storage means for storing digital information which is received from the data processing device. The digital information is passed through the plurality of stage storage means of the delay device. While the digital information is passed through the delay device, a translating means translates the digital information as it is passed through the stage storage means. The translating means is coupled to the data processing device and directs a selected data processing operation. The delay device re-enters the passed digital information into the data processing device and the data processing device performs the selected data processing operation on that digital data in response to the translating means. The data processing device is operative for only a certain time interval after which it selectively passes the digital information into the delay device, the external source of digital information or the storage means.

FIGURE 1 is an overall diagram illustrating the general arrangements between the time sharing processors, the input and output equipment and the central memory. The time sharing processors comprise a plurality of separate memories 10, a single common data processing device 48, which is coupled to the separate memories by line 14 and a delay device 16 which communicates with and controls the separate memories 10 via line 18. The data processing device 48 communicates with external sources of digital information such as input/output equipment 20 via line 22 and a central memory 24 via line 26. The central memory 24 may subsequently service a high speed central processor 28 via line 30. Also in special cases, the data processing device 48 may communicate directly with the high speed central processor 28 via line 32.

The separate memories 10 are a plurality of storage means which store digital information including digital data and instructions therein. The storage means comprise the basic part of the time sharing processor and may be for example ten-12 bit, 4096 word magnetic core memories. A typical memory would be a random access memory and have storage reference cycles of 1000 nanoseconds. The data processing device 48 performs data processing operations including problem solving, communicating with each separate memory and communicating with external sources of digital information such as the central memory, the input and output equipment and the high speed central processor.

FIGURE 2 is an illustration of the format of a 12 bit instruction. The F portion of the instruction high order bits 6 to 11 comprises the operation code which instructs the data processing device which data processing operation it is to perform. The d portion of the instruction, low order bits 0 to 5, may comprise either the operand to be used in a data processing operation or an address within one of the separate memories, the contents of which is to be the operand.

FIGURE 3 is an illustration of the format of a 24 bit instruction. This instruction is a combination of two 12 bit words. The storage means stores digital information in 12 bit words. Thus, a higher order 12 bit words would be designated P and the lower order 12 bit words would be designated $P+1$. Considering the 12 bit word of digital information denoted by P, high order bits 6 to 11 are identified as the F portion of the instruction which designates the data processing operation the data processing device is to perform. The $d$ portion of the 12 bit word of digital information denoted by P, bits 0 to 5, is combined with the 12 bit word, or $m$ portion of digital information denoted by $P+1$, bits 0 to 11, making either an 18 bit operand or operand address.

FIGURE 4 is a logical diagram illustrating the separate memories, the data processing device, and the input/output channels and their associated control lines. In this embodiment there are 10 separate storage modules of which storage module 40 is typical. When digital information is to be read out of a storage module, the digital information is passed by an output line of which line 42 is typical, via a read line 44, into a temporary storage register 46. At the appropriate time, the digital information is transferred into the data processing device 48 where a data processing operation is performed thereon.

When digital information is to be stored within a storage module, module 40 for example, the digital information is transferred from the data processing device 48 into a Z register 50. The digital information is transferred via write line 52 to the $Z_n$ register of the separate module into which the digital information is to be stored. The selection of the appropriate $Z_n$ register is accomplished by conditioning the appropriate $Z_n$ register AND gate. For example, if storage module 40 receives the digital information, line 54 passes the digital information via AND gate 56 into the $Z_1$ register 58. AND gate 56 is conditioned by control 102 from a storage sequence control unit 100. The digital inforamtion is transferred from the $Z_1$ register 58 via line 62 and is stored within storage module 40.

Considering now the operation when the digital information is contained within the data processing device 48, certain instructed data processing operations will be performed by the data processing device upon the digital information. In this embodiment, a data processing operation is to be completed within 100 nanoseconds called a minor cycle. Thus any data processing operation which is to be performed on digital information is to be completed within this time interval. Thereafter the digital information is passed into a delay device 16 which will temporarily store the digital information for a predetermined interval of time and then re-enter that digital information into the data processing device 48 for a subsequent operation.

The delay device 70 is subdivided into 4 registers, called the A, P, Q, and K registers. Each of the registers A, P and Q have 12 connected ranks, wherein the information stored in each register may be shifted in parallel from one rank to the next. The K register has 13 ranks connected in a similar fashion to those of the other three registers. Digital information comprising instructions, operands, results, addresses, etc., relating to each of 9 separate programs may be stored in the delay device, with the information relating to each particular program stored sequentially in each rank of the 4 registers.

The A register 11 is an 18 bit accumulator or arithmetic register. It is used to store operands and results of calculations performed in the data processing device. Also, in special cases, the A register holds an 18 bit address for the central memory.

The P register 13 is a 12 bit address register which holds the address of the current instruction. At the beginning of each instruction, the contents of P are advanced by one to provide the address of the next instruction in the program. If a jump is called for, the jump address is entered in P.

The Q register 15 is a 12 bit register which holds the operand comprising the lower order 6 bits, or the *d* portion, of the 12 bit instruction in FIGURE 2. When the 6 bits specify an address, the Q register 15 then stores the 12 bit word which is read from that address. The K register 17 is a 9 bit register which holds the upper six bits or the F portion (operation code) of an instruction and a three bit trip count designator. The trip count is the number of times the instruction has been around the delay device and controls the sequential executions of an instruction by providing an indication of the number of memory references which an instruction has made.

The delay device registers are divided into twelve connected ranks, except for the K register, which is divided into thirteen connected ranks. Digital data and instructions relating to nine independent programs may be stored concurrently in these register ranks. The digital data is shifted through each of the twelve ranks, requiring 900 nanoseconds to proceed from the first rank through the last rank. The output from the last rank of the delay device is connected into the data processing device 48, so that digital data and instructions relating to each of the nine programs are sequentially gated into the data processing device. The data processing device performs operations on the data, as directed by the instructions, through a 100 nanosecond period, and then gates the digital data and instructions back into the first rank of the delay device. Each storage module is associated with a particular set of digital information and is synchronized to provide new instructions or data from its memory to the data processing device at the same time as its associated digital information is gated from the last rank of the four registers. Since information relating to each of nine independent programs can be stored concurrently in the delay device, information relating to a tenth independent program may be stored in the data processing device. Thus, the delay device and data processing device together are capable of storing information relating to ten independent programs at any given time, each program associated with a specific storage module.

The delay device 16 is connected to a translate K unit 82 for translating the instruction operation code in the K register before the digital information, which includes both instruction and operand data, is re-entered into the data processing device. The output of the translate K unit 82 is connected to the data processing device 48 via line 21 to direct the operation of the data processing device at the time the associated digital information is re-entered into the data processing device. The translation of the instruction to the operation code takes a small increment of time, thus by translating the instructions from the K register 17 prior to receipt by the data processing device, both the translated instruction and the operand data are re-entered simultaneously into the data processing device allowing the immediate operation thereon.

As discussed hereinbefore, the P register 13 contains the current address and the Q register 15 is capable of containing an operand address. The contents of the P and Q registers are gated into the G register 86 and translated prior to re-entry of digital information into the data processing device to allow the contents of the address designated by P or Q to be read from the storage module, to be transferred and made available to the data processing device 48 simultaneously with the digital information from the delay device 16.

In FIGURE 4, the instruction in the K register 17 is sensed via line 80 by the translate K unit 82. The translate K unit translates the instruction and directs the data processing device via line 21 to perform the instructed data processing operation.

The current address in the P register 13 is passed via line 84 to a G register 86. The G register then addresses the appropriate storage module, reading out the appropriate operand from the addressed location in memory. For example, consider the addressing of storage module 40 via G register 86. Register G passes the address via line 88 to AND gate 90. The other condition on AND gate 90 is from the storage sequence control 100 via line 104. AND gate 90 will pass the address to an S register 92. The S register 92, via line 94, then directs the reading of the contents from the addressed location within the storage module 40. The contents of the addressed memory location appears on output line 42.

Similarly, if the Q register 15 contains an operand address, that address will be passed via line 96 to the G register 86. Thereafter the G register operation is identical to that as described previously.

The storage sequence control unit 100 is synchronized with the delay device such that the appropriate AND gates as described are conditioned to transfer digital information between the storage modules and the data processing device 48 at the correct time.

As stated previously, the data processing device 48 is connected to external sources of digital information. This includes a central memory which is capable of storing 60 bit words. Since the embodiment herein utilizes a 12 bit word, the data processing device must be capable of assembling 12 bit words into a 60 bit word. This is accomplished by means of assembly registers, for example assembly register 110. If the 12 bit word in the data processing device is to be the lower order 12 bits, the data is passed via line 112 into register 114. Similarly, if the 12 bit word is to be the highest order 12 bits of the 60 bit word, the data is passed via line 116 to register 118. It is apparent that five 12 bit words can be combined to make a total 60 bit word via the assembly register. Similarly, the disassembly registers 120 provide the means for receiving a 60 bit word from the central memory including the selection of a 12 bit word out of the 60 bit word for use within the data processing device.

The data processing device 48 is coupled to input/output equipment 20 via a plurality of input-output channels. Typically, input channel 1 would pass digital information from a selected piece of input/output equipment to the $R^1$ register 19. The $R^1$ register 19 then enters the information into the data processing device 48. If, for example, information is entered into the data processing device 48 and that information is to be stored in a storage module, the data processing device 48 performs the data processing operation of passing the information to the Z register 50. Thereafter, the contents of the Z register 50 are stored within the memory at the addressed location specified by the program. A control line 122 is associated with the input channel 1 for control purposes.

Similarly, output channels are used to pass digital information from the data processing device 48 into a selected piece of input/output equipment 20. A typical path is the output channel 1 line. Also, each output channel line has a control line associated therewith for control purposes. Control line 124 is typical and is associated with output channel 1.

In FIGURE 4, only channels 1 and 10 are illustrated. Further, the number of input/output channels and pieces of equipment are a design choice.

Figure 5:
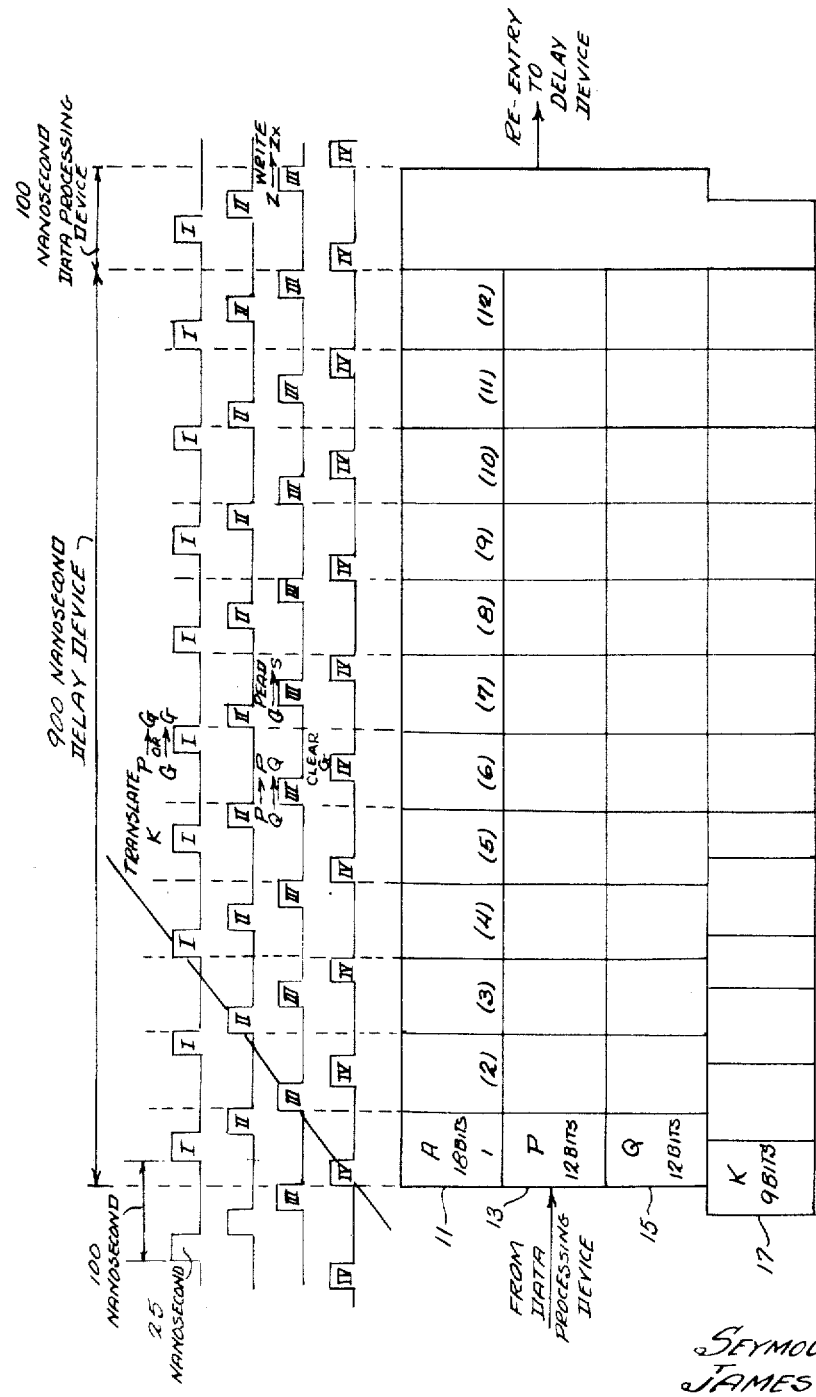
FIGURE 5 is a map of the registers within the delay device portion of the time sharing processor including the controlling clock pulses.

Summarizing, the data processing device 48 is capable of performing a plurality of data processing operations. Each data processing operation requires one or more minor cycles to execute fully. The delay device 16 stores nine programs while the data processing device 48 is operating on the tenth. Each program is associated with a separate storage memory and is executed in a multiplexing arrangement using the principle of time sharing. Thus each program operates from a separate memory, but all programs share the common data processing device for add, substract, input and output of digital information, information transfer to and from central memory and other necessary control functions. The data processing device comprises adders, subtracters, shift registers and other components which are known in the computer art for performing data processing operations. This invention is directed toward a method and means for the time sharing of these components and it is anticipated that all such of these components and the like are included within the data components and the like are included within the data processing device. In this embodiment, the total time required for a combined data processing operation and passage through the delay device is 1000 nanoseconds, which is the time required to complete a memory reference cycle. In the following examples, the delay device 16 requires 900 nanoseconds to pass digital information through its plurality of ranks. The data processing device 48 requires 100 nanoseconds to perform an operation. FIGURE 5 is a map of the registers within the delay device. The A register 11 contains 18 parallel flip-flops, one for each bit. The P and the Q registers 13 and 15 each contain 12 parallel flip-flops, one for each bit. The K register 17 contains 9 parallel flip-flops, one for each bit. Thus the delay device 16 is capable of storing 621 total bits and the data processing device 48 is capable of retaining 51 bits during its operation.

The A, P and Q registers are subdivided into 12 stages corresponding to the clock pulses. Each stage represents 75 nanoseconds of delay time within the delay device. Superimposed on this map are timing or clocking pulses which control the passage of the digital information through the stages. Further, the clock pulses time the passing of digital information into the delay device and time the re-entering of the digital information into the data processing device. Each clock pulse is 25 nanoseconds in duration. The period of each pulse is 100 nanoseconds measured from the leading edge of one pulse to the leading edge of another pulse as illustrated in FIGURE 5. The clock pulses are essentially four separate clocks, clock I, clock II, clock III and clock IV. Clock I leads clock II by 25 nanoseconds. Similarly clock II leads clock III and clock III leads clock IV by 25 nanoseconds.

The 900 nanoseconds of time associated with the delay device is considered as commencing at the left side or at the point where digital information is passed from the data processing device into the delay device. Except for the K register, digital information is passed into the delay device 16 only at clock IV. Since the data processing device 48 requires 100 nanoseconds of time to perform its operation, it is apparent that by considering the total number of clock IV pulses in the total 900 nanoseconds in the delay device, that the delay device is capable of storing 9 separate groups of digital data. Also at clock IV, the digital data is re-entered into the data processing device from the delay device.

Clock I pulses control the translate K operation, the P to G transfer or the Q to G transfer. Clock II pulses are used for stepping control only. Clock III controls a P to P transfer or a Q to Q transfer between groups, a read G to S transfer, and a write Z to Z$^x$ transfer. Clock IV controls the clear G, the storage module to F$d$ transfer and the F$d$ to Z transfer.

The K register 17 is shifted slightly relative to the A, P and Q register reducing the time of the instruction in the data processing device to 75 nanoseconds.

Figure 6:
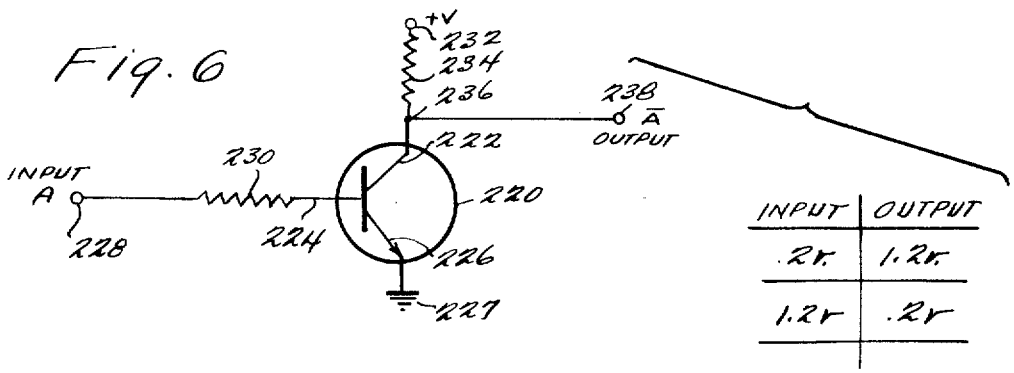
FIGURE 6 illustrates a typical transistor amplifier which may be utilized within the time sharing processor.

Before discussing in detail the logical diagram illustrating the clocked storage stages for one bit in each of the registers, a typical transistor amplifier, AND gate, OR gate and flip-flop will be considered, including their logical symbols which are used in the logical diagram. The basic transistor circuit is illustrated in FIGURE 6, the AND gate in FIGURE 7, the OR gate in FIGURE 8, the flip-flop in FIGURE 9 and a chart for the flip-flop in FIGURE 10.

Figure 12:
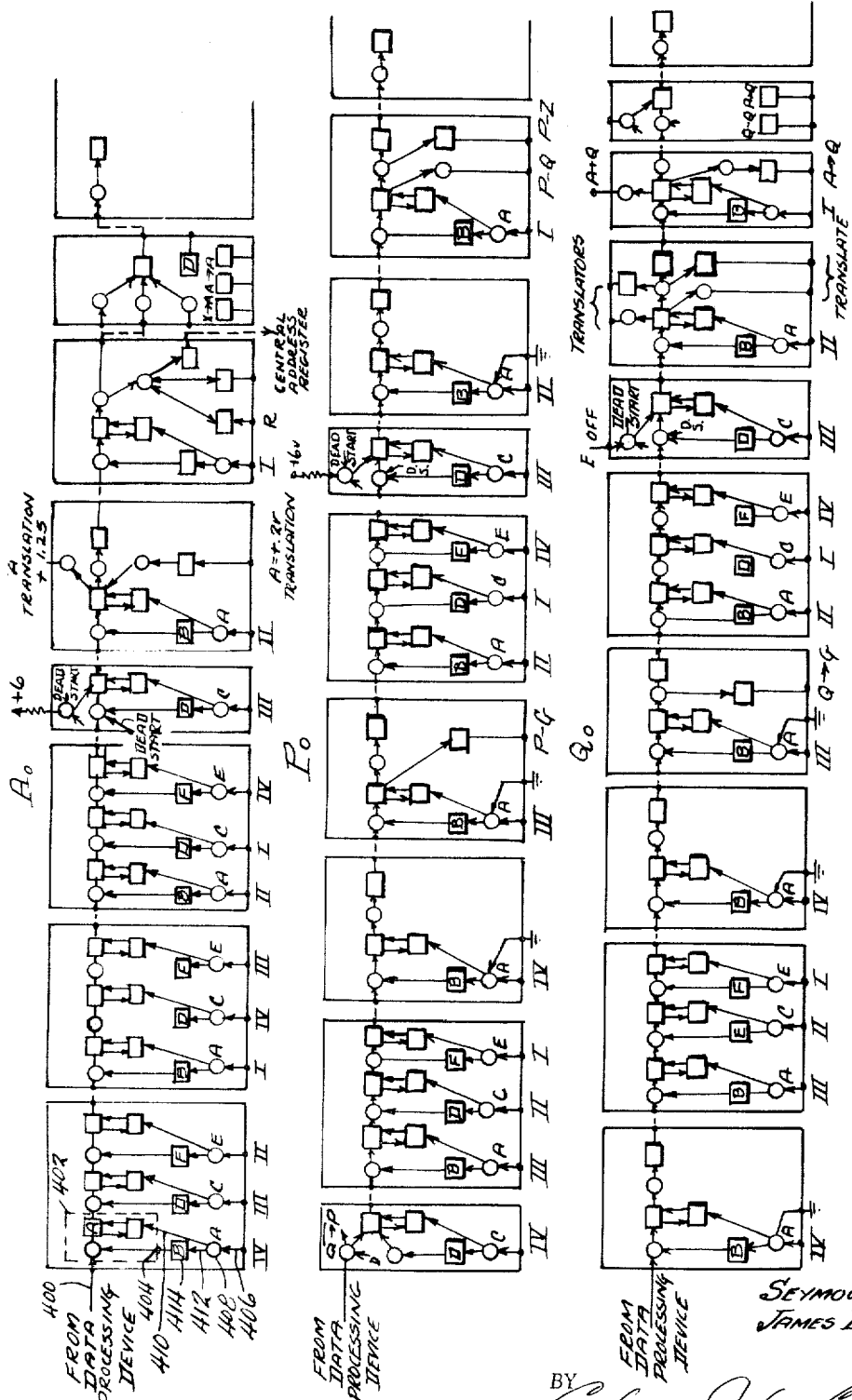
FIGURE 12 is a logical diagram illustrating in detail the flip-flops and their associated control within the delay device for the bits $A_0$, $P_0$, and $Q_0$ of the A, P and Q registers.

Considering now the basic transistor circuit of FIGURE 12, the basic circuit is a single NPN transistor 220 having a collector 222, a base 224 and an emitter 226.

The transistor 220 is connected as a grounded emitter amplifier circuit with its emitter 226 connected to a ground 227. The base 224 is connected to one end of a base resistance 230. An input 228 is connected to the other end of base resistance 230. The collector 222 is connected to one end of a collector resistance 234. The other end of collector resistance 234 is connected to a voltage supply of +V volts at point 232. An output 238 is also connected to the collector 222 at point 236.

A typical transistor selected for use in the basic circuit would have characteristics similar to those set forth in Table A herein below. The +V voltage supply is 6 volts. The minimum voltage which could be applied to the input 228 and still retain the transistor 220 in conduction is +.8 v. If a voltage below +.8 v. is applied to the input 228, virtually no conduction will occur in transistor 220. Thus for an illustrative example of circuit operation, two signal levels may be selected: a +.2 v. applied to the input 228 would drive the transistor into cutoff to provide no conduction of transistor 220; a +1.2 v. applied to the input 228 would drive the transistor into saturation to provide for maximum conduction of transistor 220. A practical reason for selecting these voltage signal levels is that the circuit can reject noise signals of up to +.5 volt.

TABLE A.—TYPICAL OPERATING CHARACTERISTICS OF TRANSISTOR

| State | $V_b$ | $V_c$ | $I_b$ | $I_c$ | |
|---|---|---|---|---|---|
| Cutoff | .2 v | 1.2 v | 0 | 0 | Average switching time five nanoseconds. |
| Saturation | 1.2 v | .2 v | 1 ma | 10 ma | |

The operation of the transistor amplifier may be understood by assuming that a +1.2 v. input signal is applied to input 228. Input 228 via base resistance 230 applies the +1.2 v. to the base 224. If a voltage of +1.2 v. is applied to the base 224, the transistor 220 is driven into saturation and thus conducts heavily. The voltage appearing across the collector 222 and the emitter 226 will subsequently be +.2 v., which voltage is the drop across the transistor. Further, since output 238 is connected to the collector 222 at point 236, the output voltage will be +.2 v.

If a subsequent input voltage of +.2 v. is applied to input 228, the +.2 drives the base 226 to +.2 v. from the +1.2 v. thus driving the transistor 220 into cutoff. The switching time required to switch from saturation to cutoff is approximately 5 nanoseconds. Since the transistor 220 is no longer able to condut, the collector 222 begins to approach the +6 volts supply voltage which also tends to raise the output 238 to the supply voltage level. However, the output 238 and subsequently the collector 222 are held at a +1.2 by other circuits to which the output 238 is connected as will be explained in considering the AND and OR circuits—also, it is possible for a single collector resistance to have up to six collectors connected to it for operation.

The inherent 180° phase shift of the transistor provides a characteristic which can have a logical connotation associated with it. For example, if the input to the circuit is denoted as A, the output from the basic circuit is $\overline{A}$. Thus the transistor provides a basic inversion or NOT function.

The basic transistor circuits can be combined to form AND and OR circuits. Consider the basic AND circuit of FIGURE 7. The AND circuit has three NPN transistors 240, 260 and 280. Transistor 240 has a collector 242, a base 244 and an emitter 246 and is connected as a grounded emitter amplifier with emitter 246 connected to ground 247. Base 244 is connected to one end of a base resistance 250. The other end of resistance 250 is connected to an input 248. The collector 242 is connected to one end of a collector resistance 252. The other end of resistance 252 is connected to a +V voltage source at point 254. Transistor 260 has a collector 262, a base 264 and an emitter 266 and is connected as a grounded emitter amplifier with emitter 266 connected to ground 267. Base 264 is connected to one end of a base resistance 270. The other end of resistance 270 is connected to an input 268. The collector 262 of transistor 260 is connected to a common collector line 256 at point 272. Common collector line 256 is subsequently connected to collector 242 of transistor 240. Thus, common collector line 256 connects the collector 242 and collector 262 to a common collector resistance 252. The output from the common collector line 256 is connected to another basic amplifier which include transistor 280. Transistor 280 has a collector 282, a base 284 and an emitter 286 and is connected as a grounded emitter amplifier with emitter 286 connected to ground 287. The base 284 is connected to one end of a base resistance 274. The other end of the base resistance 274 is connected to the common collector line 256 at point 272. The collector 282 is connected to one end of a collector resistance 292. The other end of resistance 292 is connected to a +V voltage source at point 294.

Figure 7:
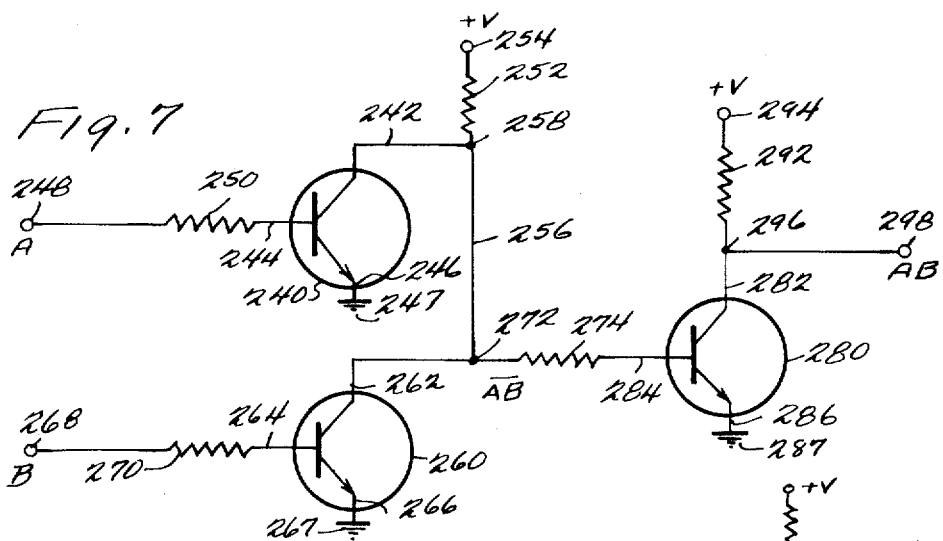
FIGURE 7 illustrates a typical AND gate utilizing the transistor amplifier of FIGURE 6.

The circuit of FIGURE 7 is such that if the input voltages are .2 v., the output of the AND circuit will be .2 v. The .2 v. inputs are applied to input 248 of transistor 240 and to input 268 of transistor 260. The .2 v. input at 248 is applied to base 244 via base resistance 250. The .2 v. applied to base 244 drives the transistor into cutoff causing collector 242 to attempt rising to the +V voltage of the voltage source +V. The final output voltage of collector 242 is also dependent upon the output voltage of collector 262 as will be described. The .2 v. input applied to input 268 of transistor 260 will be applied to base 264 via base resistance 270. The .2 v. on the base 264 will drive transistor 260 into cutoff causing the collector 262 to attempt to rise to the +V voltage of the voltage source +V. Referring to the common collector line 256, since both collectors are attempting to rise to the +V voltage, line 256 will also be driven toward the +V voltage. However, as had been discussed in the basic circuit, the collector output will be stabilized at +1.2 v. Thus looking specifically at point 272, the voltage on line 256 is applied via base resistance 274 to base 284 of transistor 280. The voltage, which is approximately +1.2 v. on base 284, will drive transisotr 280 into saturation causing the collector 282 to be held at +.2 v. Output 298, which is connected to collector 282 at point 296, is also at +.2 v.

Again logical connotation can be applied to the basic circuit. Assume that the inputs into the AND gate are A and B respectively. The A and B are inverted by their respective transistors and appear as $\overline{A}$ and $\overline{B}$ outputs. These outputs are combined $\overline{A}+\overline{B}=(\overline{AB})$ as the output of the first pair of transistors. Thereafter the $(\overline{AB})$ is applied to a single transistor which produce (AB), the desired output signal.

Referring again to the AND circuit of FIGURE 7, if input 248 is at +1.2 volts and input 268 is at +.2 v., the collectors 242 and 262 would both be held at a +.2 v. because of transistor 240 conducting. Thus point 272 would be at a +.2 v. The +.2 v. at point 272 is applied via base resistance 274 to base 284. Thereafter, if base 284 is a +.2 v., transistor 280 will be driven into cutoff which subsequently applies a +1.2 v. to the output 298. Similarly the output 298 is a +1.2 v. for the other combinations, including input 248 being +.2 v. with input 268 being +1.2 v. and both inputs 248 and 268 being +1.2 v.

Figure 8:
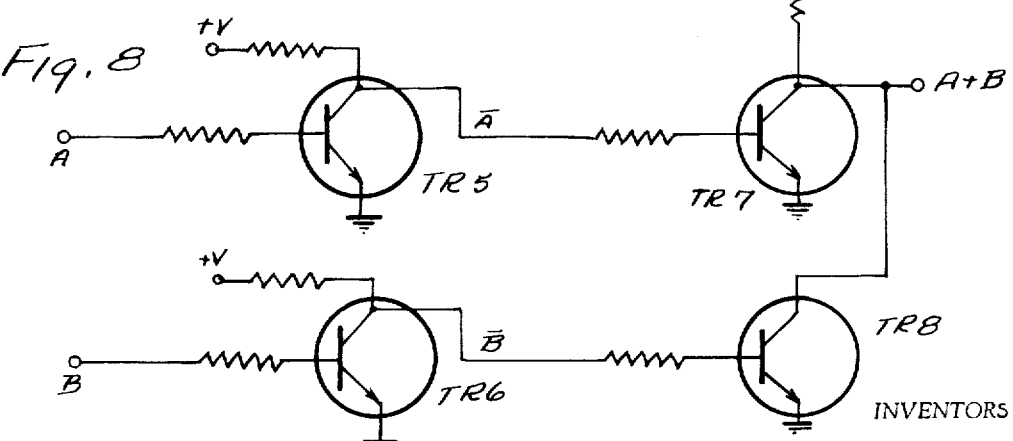
FIGURE 8 illustrates a typical OR gate utilizing the transistor amplifier of FIGURE 6.

FIGURE 8 is an electrical schematic of an OR circuit which includes four basic transistor circuits. The electronic operation of the circuit may be traced utilizing the approach discussed in both the basic circuit and the AND circuit. Thus, the operation of the OR may be described by considering logical operations rather than electronic. The four basic transistor circuits are identified as Tr5, Tr6, Tr7 and Tr8. The assumption is made that the input into the Tr5 circuit is A and the input into the Tr6 circuit is B. Each circuit is separate and independent and merely produces the inversion of its inputs. Thus, the output of Tr5 is $\overline{A}$ and the output of Tr6 is $\overline{B}$. Thereafter the outputs are applied as inputs to Tr7 and Tr8. The output of Tr5, $\overline{A}$, is applied to Tr7 and the output of Tr6, $\overline{B}$, is applied to Tr8. The collectors of Tr7 and Tr8 are connected together and have a common collector resistance. Thus the output from the combined collectors is $A+B$. The overall OR circuit logically is $A+B$ and the logic of the Tr7 and Tr8 in combination is $\overline{\overline{A}.\overline{B}}=\overline{\overline{A}}+\overline{\overline{B}}$.

Figures 9, 10, 11A:
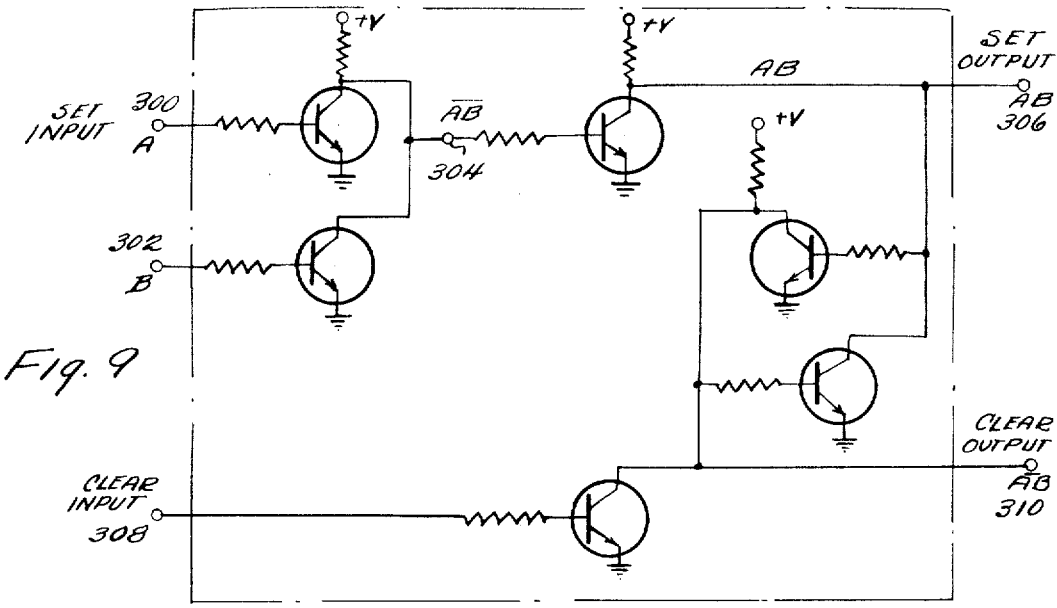
FIGURE 9 illustrates a typical flip-flop utilizing the transistor amplifier of FIGURE 6.
FIGURE 10 is a chart illustrating typical voltage levels of the flip-flop of FIGURE 9.
FIGURES 11a through 11f are logical symbols illustrating the basic electrical circuits set forth in FIGURE 6 through FIGURE 9.

FIGURE 9 is a schematic of a transistor flip-flop. The input to the flip-flop comprises two basic transistor circuits for combining input signals. The remainder of the flip-flop comprise four basic transistor circuits connected to insure bi-level operation. The flip-flop has two set inputs, 300 and 302, a set output 306, a clear input 308 and a clear output 310. The chart of figure 10 illustrates the voltage combinations possible with the flip-flop. Generally, both the set inputs 300 and 302 must be +.2 v. to set the flip-flop. All other combinations do not set the flip-flop, but keep it clear. When the flip-flop is set, the set output 306 is +.2 v., the clear input 308 is +1.2 v. and the clear output 310 is a +.2 v.

The logical function of the flip-flop may be explained by assuming that the two inputs are A and B. The set output would be AB and the clear output would be $\overline{AB}$.

In the discussion hereinafter, the logic diagram symbols to be used are shown in FIGURE 11a. The symbols will serve to represent the basic electronic circuits described hereinbefore.

Figure 11B:
Figure 11C:

The basic transistor amplifier circuit of FIGURE 6 may be shown either as the arrow-square combination of FIGURE 11b or the arrow-circle combination of FIGURE 11c. Electrically, the circle and square represent a collector load resistance.

Figure 11D:
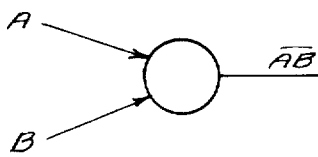

The AND gate of FIGURE 7 is illustrated by FIGURE 11d. The output of the square is $\overline{(AB)}$ which equal AB.

Figure 11E:
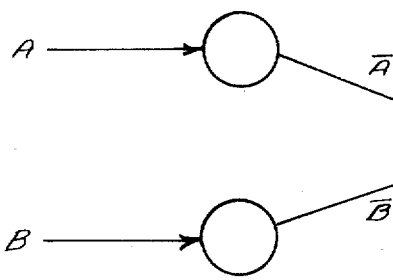

The OR gate of FIGURE 8 is illustrated by FIGURE 11e. The output of the square is $\overline{\overline{A}+\overline{B}}$ which equal $A+B$.

Figure 11F:
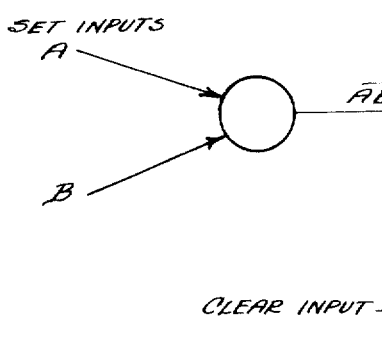

The flip-flop of FIGURE 9 is illustrated by FIGURE 11f. The set output is equivalent to AB or clear. The clear output is $\overline{AB}$ or clear.

Typical methods for interconnecting the above described transistor circuits may be found in two copending applications, the first being entitled, "A Twisted Pair Transmission System," by Lester T. Davis, Ser. No. 381,041, filed July 8, 1964, and the second being entitled "A Coaxial Cable Transmission System," by Lester T. Davis, Ser. No. 381,040, filed July 8, 1964.

FIGURE 12 is a logical diagram illustrating the logic associated with a single bit of each register. For example, in the A register, specifically bit $A_0$, are twelve stages of flip-flops which store the bits of digital information. Each of the twelve stages is conditioned by one of the four clock pulses described previously. The first stage 402 of bit $A_0$ is conditioned by a clock IV pulse. This stage is identified as the first clock IV stage. The second stage of bit $A_0$ is conditioned by a clock III pulse. This stage is identified as the first clock III stage. The timing chart of FIGURE 5 illustrates that the clock III pulse occurs 75 nanoseconds after the clock IV pulse. Thus, the clock IV would condition the first clock IV stage to receive a bit of digital information from the data processing device 48. After the bit is received by the first clock IV stage, it is available to the first clock III stage when that stage is conditioned by the clock III pulse. When the clock III pulses condition the first clock III stage, the bit of digital information in the first clock IV stage is passed to the first clock III stage. The next clock IV pulse will again condition the first clock IV stage to receive a bit of digital information from the data processing device. At the end of 150 nanoseconds, both the first clock IV stage and the first clock III stage contain information therein. In the 900 nanoseconds associated with the delay device, nine clock IV pulses will occur. Since a bit of digital information is passed from data processing device 48 into the delay device 16 on a clock IV pulse, it is apparent that nine independent programs are contained with the delay device 16 at any time.

On the timing chart of FIGURE 5, the timing sequence of stages may be determined by reading the clock pulses diagonally as shown. The timing sequence for the $A_0$ bit within the A register is IV, III, II, I, IV, III, II, I, IV, III, II and I. Thus the stages in FIGURE 12 are identified by the clock pulses.

Basically each stage of the A register is logically a flip-flop. For example, the flip-flop of the first clock IV stage 402 has two inputs 400 and 404. Electrically both inputs must be at +.2 v. level to set the flip-flop as described previously. Assume that the input 400 from the data processing device is at the +.2 v. level. This indicates that the digital information to be stored in the first clock IV stage is to set the flip-flop 402. When the clock IV pulse conditions the first clock IV stage, a +.2 v. is applied to line 406. This electrically makes the outputs 410 and 412 of AND gate 408 a +1.2 v.

Output 410 applies the +1.2 v. to the clear input of the flip-flop 402. This clears the flip-flop in preparation for the receipt of a bit from the data processing device. Concurrently output 412 conditions OR gate 414. This electrically makes the output 404 of OR gate 414 a +.2 v. Output 404 is the other set input into flip-flop 402. Thus, both set inputs into the flip-flop 402 are +.2 v. causing the flip-flop to set. It is apparent that after the clock pulse IV is applied to line 406, the time required for the set input 404 to be conditioned by the +.2 v. is delayed slightly by OR gate 414 to allow output 410 of AND gate 408 to clear the flip-flop 402. As previously stated, it was assumed that set input line 400 had a +.2 v. applied thereon, which input ultimately sets the flip-flop 402. However, if set input line 400 has +1.2 v. applied thereon, the flip-flop 402 will remain cleared and cannot be set. This principle of clear-set is utilized in each clock stage to pass the bit of digital information through the delay device.

As the bit of digital information is passed through the delay device, certain translations or conditions are made. For example, at the third clock II stage, a translation is made determining whether the bit is a voltage level of a +1.2 v. or a +.2 v. Other translations are made at the various stages.

The translation logic is designed to follow the general rule that a signal passes through 4 inverters per 25 nanoseconds. Thus at the third clock II stage and the third clock I stage, several translations can be made while maintaining proper timing. At the third clock I stage, the bit of digital information is re-entered into the data processing device.

The P and Q registers have identical operation as illustrated by the logic associated with the $P_0$ and $Q_0$ bits. Again, several translations occur as the bit of digital information is passed through the delay device. For example, at the second clock III stage, the contents of the P register 13 is available for transfer to the G register 86 (FIGURE 4). It is important to note that each stage of each register is clocked such that all the bits of digital information are simultaneously entered into the data processing device at the same time.

Figure 13:
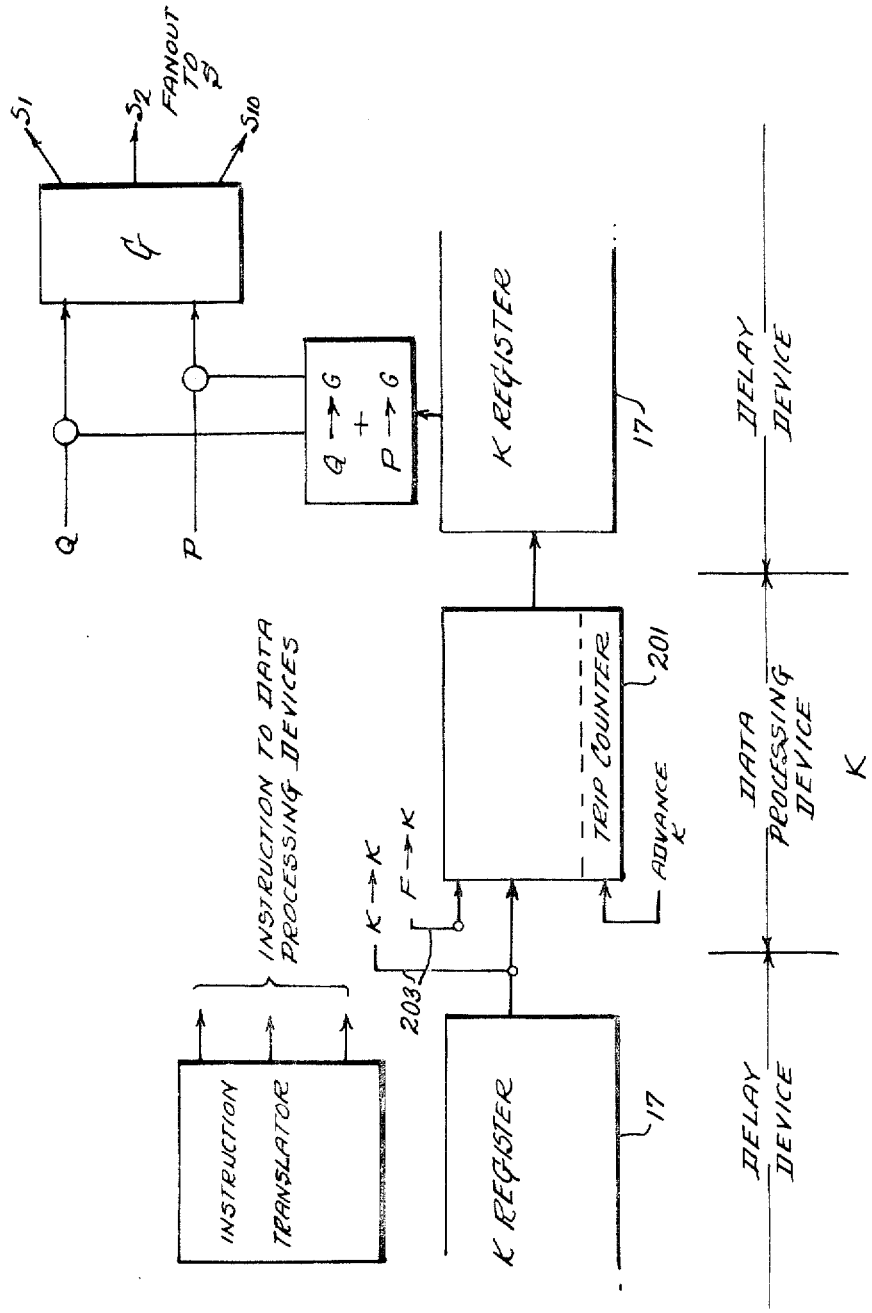
FIGURE 13 is a block diagram illustrating the K instruction register and its associated controls for translating and executing instructions.

FIGURE 13 is a block diagram illustrating the K instruction register 17 and its associated controls for translating and executing an instruction. After the instruction is passed through the data processing device, the first instruction or operation conditions the transfer of the contents of the P or Q register to the G register 86. Thereafter, the G register 86 conditions the proper storage module as illustrated in FIGURE 4. All other instructions other than the instruction to transfer the contents of P and Q to S via G are translated by the instruction translator. When the instruction is translated, it is passed to the data processing device, the translated instruction directs the appropriate data processing operation. The trip counter 201 counts the number of times the instruction has been around the delay device. The trip counter 201 also controls the sequential execution of an instruction. Also control means 203 are provided for passing the instruction from the K register 17 to the data processing device 48 or for loading a new operation code F into the K portion of the data processing device.

Figure 14:
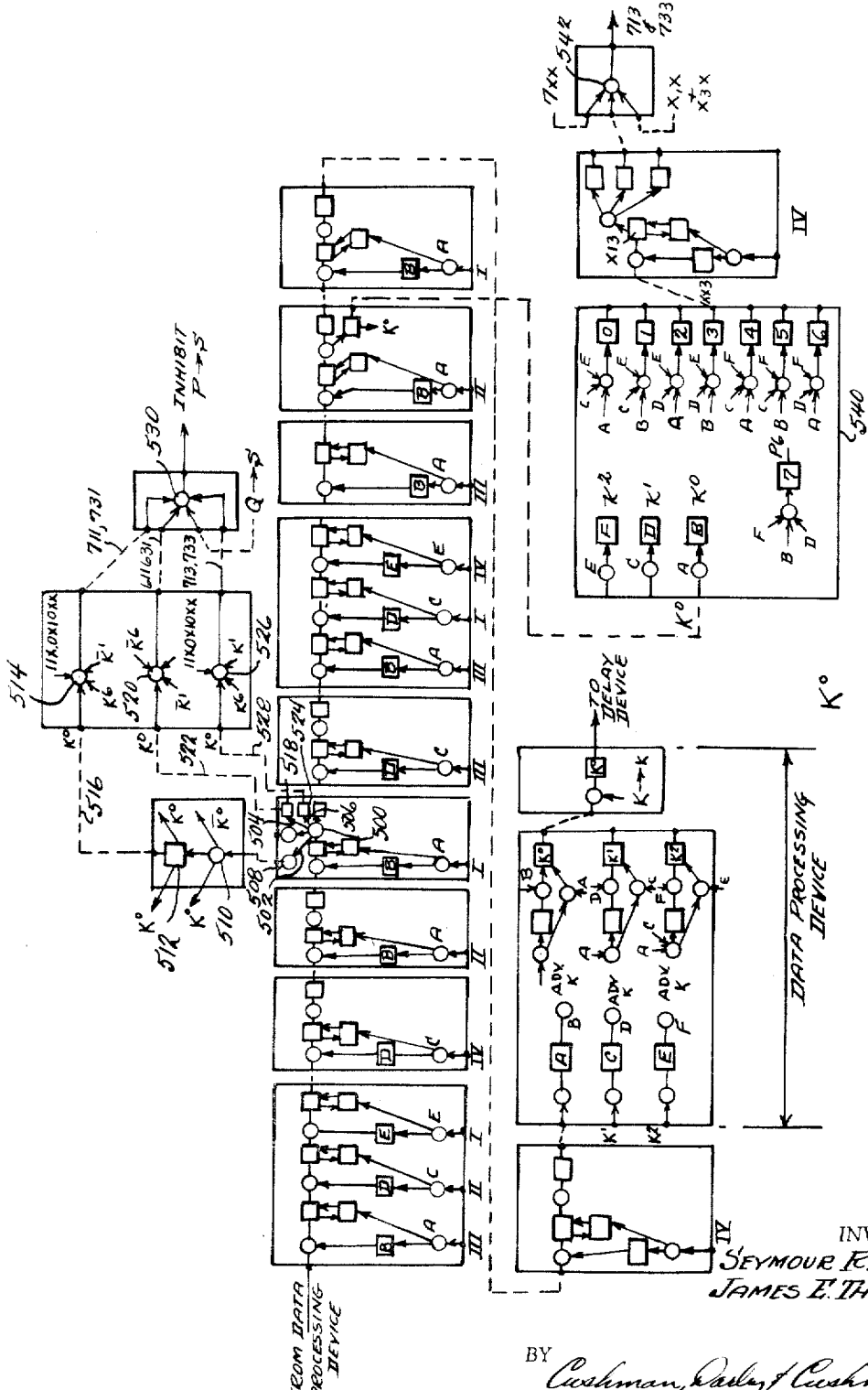
FIGURE 14 is a logical diagram illustrating in detail the K register and its associated control shown in FIGURE 13.

FIGURE 14 is a logical diagram illustrating in detail the K register 17 and its associated controls shown in FIGURE 13. Each stage of the K register is clocked as illustrated by the logical diagrams for bit $K^0$. The clock pulse sequence is III, II, I, IV, II, I, III, II, I, IV, III, II, I and IV. As discussed previously, the K register instruction is within the data processing device for only 75 nanoseconds. Further, the timing of K register 17 by the clock pulses is not uniform until after the translate K function is performed. The total time required for the digital data to pass through the K register 17 is then 925 nanoseconds. The timing clock pulse illustrated in FIGURE 5 conditions the clock stages of the K register in proper sequence.

In FIGURE 14, at the second clock I stage, a translation of the K instruction is performed to determine: if a P to S transfer (via G register 86) is to be performed; if a P to S transfer is to be inhibited; if a Q to S transfer (via G register 86) is to be performed; or if a Q to S transfer is to be inhibited. The illustration of FIGURE 14 shows for purpose of example, a typical inhibit P to S transfer. The inhibit P to S transfer occurs when the instruction is a 11X0X10XX basic instruction. In this instruction the $K^0$, $K^1$, $K^4$ and $K^6$ bits are unknown or variable.

Considering the AND gate 500 in the second clock I stage, this AND gate has several outputs of which 502, 504 and 506 are typical. Output 502 is an input to AND gate 508. The output of AND gate 508 is applied to AND gate 510. The output of AND gate 510 is the input to OR gate 512. The output of OR gate 512 is applied to AND gate 514 via output 516. If the assumption is made that +.2 v. level is a K bit, and a +1.2 v. level is a $\overline{K}$ bit, the following condition exists. Input 516 is the $K^0$ bit. Other outputs $K^0$ from the 512 OR gate are applied to AND gates of other bits (not shown). Similarly, the outputs $\overline{K}^0$ from the AND gate 510 are applied to AND gates of other bits (not shown).

Output 504 is applied to OR gate 518. The output from OR gate 518 is applied as an input to AND gate 520 via line 522.

Output 506 is applied to OR gate 524. The output from OR gate 524 is applied as an input to AND gate 526 via line 528.

Considering now AND gates 514, 520 and 526, each AND gate has an input $K^0$, input 11X0X10XX and inputs from the $K^1$ and $K^6$ bits. Since the $K^0$ bit is a +.2 v. and a $\overline{K}^0$ bit is a +1.2 v. the $K^1$ and a $K^6$ bit is a +.2 v. and $\overline{K}^1$ and $\overline{K}^6$ are a +1.2 v. The 11X0X10XX input is considered to be at the +.2 v.

AND gate 514 then has inputs $K^0$, $K^6$, $\overline{K}^1$ and 11X0X10XX. The two possible combinations yielded by the AND gate 514 in octal are 711 and 731 since the $K^4$ bit is unknown.

AND gate 520 has inputs $K^0$, $\overline{K}^6$, $\overline{K}^1$ and 11X0X10XX. The two possible combinations yielded by AND gate 520 in octal are 611 and 631.

AND gate 526 has inputs $K^0$, $K^6$, $K^1$ and 11X0X10XX. The two possible combinations yielded by AND gate 526 in octal are 713 and 733.

The outputs from AND gates 514, 520 and 526, which are +.2 v., +.2 v. and +1.2 v. respectively, are then applied as inputs to AND gate 530. A fourth input to AND gate 530 is the Q to S transfer which when enabled is at a +.2 v. level (not shown). Thus, the inputs to AND gate 530 are +.2 v. for the 711 and 731 input, +.2 v. for the 611 and 631 input, +1.2 v. for the 713 and 733 input and +.2 v. for the Q to S transfer input. Since AND gate 530 is not conditioned because at least one input is at the +1.2 volt level. The inhibit P to S has a +.2 volt output which ultimately disables the P to S transfer. It is apparent that by combining outputs from various bit levels, the appropriate transfer can be enabled.

The instruction translation which is to determine the appropriate data processing operation occurs at the fourth clock II stage. The stage has several outputs which are applied to other bits (not shown).

The instruction translator 540 is illustrated for only the lower order three bits of the K register. The assumption made previously that a K bit is a +.2 v. and a $\overline{K}$ bit is a +1.2 v. is still applicable.

In the inhibit P to S translation, the basic instruction 11X0X10XX yielded six possible combinations with $K^0$, $K^1$ and $K^6$ at the +.2 volt level and with $K^4$ unknown. The instruction combinations were 711, 731, 631, 713 or 733. In discussing the operation of the instruction translator 540, the assumption will be made that the instruction is either octal 713 or 733.

The lower three bits of the instruction in the K register combined would be 011 (3 in octal). Concurrently, the next three bits would be 001 or 011 (1 or 3 in octal). Similarly, the highest order three bits would be 111 (7 in octal). At the third clock IV stage and during a clock IV pulse, the XX3, the X1X or X3X and the 7XX are stored in their respective stage flip-flops and then passed into the data processing device. FIGURE 14 illustrates this for the lowest order three bits XX3.

One output from the third clock IV stage is applied to a final AND gate 542 which combines inputs from each group of three bits flip-flop. Thus, AND gate 542 has input XX3 from the lower order three bits, an X1X or X3X from the next three bits and a 7XX input from the highest order three bits. Thus, the output from AND gate 542 is the translated instruction 713 or 733 octal.

However, at the third clock IV pulse, another operation in the K register occurred passing the instruction into the data processing device. When the instruction in the K register 17 is passed to the data processing device 48, a determination is made under program control (not shown) whether the instruction in K is to be advanced or passed back into the delay device. If a new instruction is to be passed from the data processing device to the delay device, the K to K transfer will be disabled (not shown) and the F to K transfer will be enabled.

It will be understood that any appropriate storage means and arithmetic units may be utilized with the inventive time sharing processor.

The above illustrative embodiment comprises a preferred embodiment of the invention. However, this embodiment is not intended to limit the possibilities of insuring the features of the time sharing processors. The processor disclosed herein is an example of an arrangement in which the inventive features of this disclosure may be utilized and it will become apparent to one skilled in the art that certain modifications may be made within the spirit of the invention defined by the appended claims.

What is claimed is:

1. A data processing system having an input/output means for receiving and transmitting digital information to external sources, storage means for storing the digital information, and data processing means for performing data processing operations on the digital information, the invention being characterized by:
    (a) the storage means comprising a plurality of independent memory devices coupled to the data processing means and controllable thereby;
    (b) the data processing means comprising:
        (1) a data processing device coupled to all of the independent memories and to the input/output means and including means for sending digital information to or receiving digital information from the independent memories, means for selectively receiving digital information from or transmitting digital information to the input/output means, means for performing arithmetic, logical, and other manipulative operations on the digital information it receives and transmits;
        (2) a delay device coupled to the data processing device and to all of the independent memories, the delay device including means for receiving digital information from the data processing device and storing it for a predetermined length of time before transmitting the digital information back to the data processing device, and means for selectively activating any of the independent memory devices in response to a coded format of the digital information which it is temporarily storing.

2. A data processing system according to claim 1 wherein the delay device includes:
    (a) means for storing a plurality of groups of digital information in the order in which the groups of digital information are received from the data processing device,
    (b) means for storing each group for a predetermined length of time, and
    (c) means for selectively activating the independent memory devices in a predetermined order corresponding to the order of the groups of digital information received from the data processing device.

3. A data processing system according to claim 1 wherein the delay device storage means includes:
    (a) a shifting matrix comprising a plurality of parallel flip-flops, each parallel flip-flop being connected to a plurality of series-connected flip-flops and
    (b) means for gating digital information stored in the flip-flops according to a predetermined timing order.

4. A data processing system according to claim 3 wherein the parallel flip-flops comprise a plurality of register means for storing digital information representing addresses in the independent memory devices, results of the operations performed by the data processing device, and instructions for directing the operations of the data processing device.

5. A data processing system according to claim 1 wherein the delay device includes means for selectively activating any independent memory device to produce an output from the memory device to the data processing device in time coincidence with the arrival at the data processing device of the delayed digital information which caused the activation of the memory device.

6. A data processing system according to claim 1 wherein the data processing device includes means for receiving digital information from the memory devices and selectively transferring this digital information to the delay device and the input/output means.

7. A data processing system according to claim 1 wherein the storage means includes a plurality of memory devices coupled to the data processing device and the delay device, the memory devices including:
    (a) means for transmitting digital information to the data processing device in response to control signals received from the delay device, and
    (b) means for storing digital information received from the data processing device in response to control signals received from the delay device.

(References on following page)

References Cited

UNITED STATES PATENTS

| | | | |
|---|---|---|---|
| 3,015,441 | 1/1962 | Rent et al. | 340—172.5 |
| 3,017,094 | 1/1962 | Strachey et al. | 340—172.5 |
| 3,021,067 | 2/1962 | Jahn | 235—164 |
| 3,143,644 | 8/1964 | Selmer | 340—172.5 |
| 3,201,760 | 8/1965 | Schrimpf | 340—172.5 |
| 3,231,868 | 1/1966 | Bloom et al. | 340—172.5 |
| 3,237,168 | 2/1966 | Hertz | 340—172.5 |
| 3,248,708 | 4/1966 | Haynes | 340—172.5 |
| 3,278,904 | 10/1966 | Lekven | 340—172.5 |

ROBERT C. BAILEY, *Primary Examiner.*

J. P. VANDENBURG, *Assistant Examiner.*